(12) United States Patent
Dawson et al.

(10) Patent No.: US 9,274,848 B2
(45) Date of Patent: Mar. 1, 2016

(54) OPTIMIZING CLOUD SERVICE DELIVERY WITHIN A CLOUD COMPUTING ENVIRONMENT

(75) Inventors: Christopher J. Dawson, Arlington, VA (US); Vincenzo V. Diluoffo, Sandy Hook, CT (US); Michael D. Kendzierski, New York, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 12/630,275

(22) Filed: Dec. 3, 2009

(65) Prior Publication Data

US 2011/0138050 A1    Jun. 9, 2011

(51) Int. Cl.
 *G06F 15/16* (2006.01)
 *G06F 9/50* (2006.01)
 *H04L 29/08* (2006.01)

(52) U.S. Cl.
 CPC ............ *G06F 9/5072* (2013.01); *H04L 67/327* (2013.01); *G06F 2209/5015* (2013.01)

(58) Field of Classification Search
 CPC .................................................. H04L 67/327
 USPC ....................................................... 709/226
 See application file for complete search history.

(56) References Cited

U.S. PATENT DOCUMENTS

| | | | |
|---|---|---|---|
| 7,222,120 B1 | 5/2007 | Mindrum | |
| 7,243,155 B2 | 7/2007 | Bou-Ghannam et al. | |
| 7,428,582 B2 | 9/2008 | Bean et al. | |
| 2002/0147974 A1* | 10/2002 | Wookey | 717/176 |
| 2003/0074393 A1* | 4/2003 | Peart | 709/203 |
| 2004/0148588 A1* | 7/2004 | Sadiq | 717/109 |
| 2006/0053378 A1* | 3/2006 | Fano et al. | 715/747 |

(Continued)

FOREIGN PATENT DOCUMENTS

WO    WO2004090750 A3 * 10/2004 ............. G06F 17/20

OTHER PUBLICATIONS

Cloud Computing: A Taxonomy of Platform and Infrastructure-level Offerings David Hilley College of Computing Georgia Institute of Technology Apr. 2009.*

(Continued)

*Primary Examiner* — Hamza Algibhah
(74) *Attorney, Agent, or Firm* — Noah A. Sharkan; Hunter E. Webb; Keohane & D'Alessandro PLLC

(57) ABSTRACT

This invention provides a system or method to provide dynamically packaged Cloud services to customers via a Cloud services registry. The Cloud services registry is dynamic and operates by polling different Cloud service providers and Cloud service databases to ensure that the Cloud services registry is up to date with the latest available Cloud services. The Cloud services registry is available for queries from Cloud customers and abstracts multiple Cloud service providers. By abstracting the Cloud services, the dynamic Cloud services registry creates a modular package of different services from different Cloud service providers based on the query and requested priority for services. The dynamic Cloud registry is dynamically updated based on the level of services that the provider has available. The dynamic registry determines what service best matches the requirements from a Cloud service request (CSR) and returns a personalized set of matching services.

16 Claims, 8 Drawing Sheets

(56) References Cited

U.S. PATENT DOCUMENTS

| | | | |
|---|---|---|---|
| 2006/0107035 A1* | 5/2006 | Tamas et al. | 713/150 |
| 2006/0253596 A1* | 11/2006 | Barone et al. | 709/229 |
| 2007/0011126 A1* | 1/2007 | Conner et al. | 706/47 |
| 2007/0198656 A1* | 8/2007 | Mazzaferri et al. | 709/218 |
| 2008/0065402 A1* | 3/2008 | Sanamrad | 705/1 |
| 2008/0080396 A1 | 4/2008 | Meijer et al. | |
| 2008/0080552 A1 | 4/2008 | Gates et al. | |
| 2008/0082490 A1 | 4/2008 | MacLaurin et al. | |
| 2008/0082671 A1 | 4/2008 | Meijer et al. | |
| 2008/0104393 A1 | 5/2008 | Glasser et al. | |
| 2008/0274765 A1* | 11/2008 | Lopez et al. | 455/552.1 |
| 2009/0055466 A1* | 2/2009 | Hadas et al. | 709/202 |
| 2009/0055877 A1* | 2/2009 | Rhim | 725/87 |
| 2009/0066722 A1* | 3/2009 | Kriger et al. | 345/619 |
| 2009/0089438 A1* | 4/2009 | Agarwal et al. | 709/228 |
| 2009/0138876 A1* | 5/2009 | Chang | 717/176 |
| 2009/0187654 A1* | 7/2009 | Raja et al. | 709/224 |
| 2009/0193394 A1* | 7/2009 | Dasch et al. | 717/120 |
| 2009/0235342 A1* | 9/2009 | Manion et al. | 726/7 |
| 2009/0248693 A1* | 10/2009 | Sagar et al. | 707/10 |
| 2009/0292582 A1* | 11/2009 | Ebert et al. | 705/10 |
| 2009/0327905 A1* | 12/2009 | Mascarenhas et al. | 715/738 |
| 2010/0050239 A1* | 2/2010 | Carter et al. | 726/4 |
| 2010/0061250 A1* | 3/2010 | Nugent | 370/242 |
| 2010/0131624 A1* | 5/2010 | Ferris | 709/221 |
| 2010/0169261 A1* | 7/2010 | Lindenlaub et al. | 706/47 |
| 2010/0191783 A1* | 7/2010 | Mason et al. | 707/822 |
| 2010/0198840 A1* | 8/2010 | Basu et al. | 707/749 |
| 2010/0235325 A1* | 9/2010 | Godil et al. | 707/640 |
| 2010/0250515 A1* | 9/2010 | Ozonat et al. | 707/709 |
| 2010/0250746 A1* | 9/2010 | Murase | 709/226 |
| 2010/0250747 A1* | 9/2010 | Karaoguz et al. | 709/226 |
| 2010/0269048 A1* | 10/2010 | Pahlavan et al. | 715/740 |
| 2010/0318454 A1* | 12/2010 | Warncke et al. | 705/37 |
| 2010/0332262 A1* | 12/2010 | Horvitz et al. | 705/4 |
| 2011/0022642 A1* | 1/2011 | deMilo et al. | 707/805 |
| 2011/0055034 A1* | 3/2011 | Ferris et al. | 705/26.1 |
| 2011/0090911 A1* | 4/2011 | Hao et al. | 370/395.53 |
| 2012/0016778 A1* | 1/2012 | Salle et al. | 705/27.1 |

OTHER PUBLICATIONS

Mell, et al., "The NIST Definition of Cloud Computing", National Institute of Standards and Technology, Information Technology Laboratory, Version 15, Oct. 7, 2009, 2 pages.

Maitland, J., "Keeping Control Isn't Easy", Chapter 4: Cloud-Based Infrastructure, SearchCloudComputing.com, 13 pages.

* cited by examiner

CLOUD SERVICE MENU SYSTEM

REQUIREMENTS
ANTI-VIRUS                - 50%
CONTENT FILTERING         - 20%
EMAIL CALENDARING         - 15%
WEB-BASED EMAIL           -  5%
                          100%

SECURITY REQUIREMENTS: x.509

AVAILABILITY SLA = 99.9%
PERFORMANCE SLA = 99.99%<250ms

PRICING:
1 TO 100 USERS       = $12 SEAT
101 TO 499 USERS     = $11 SEAT
500 TO 4999 USERS    = $9 SEAT
4999 USERS+          = $7 SEAT

FIG. 6

OPTIMIZING CLOUD SERVICE DELIVERY WITHIN A CLOUD COMPUTING ENVIRONMENT

FIELD OF THE INVENTION

The present invention generally relates to Cloud computing. Specifically, the present invention relates to the optimization of Cloud services delivery within a Cloud computing environment.

BACKGROUND OF THE INVENTION

Cloud computing has become a popular way to offer various Information Technology (IT) concepts as services. In one implementation, a consumer or requestor can request a service they desire and transact with a Cloud provider for the needed service. A Cloud provider's business opportunity can be limited or constrained by the physical resources they have installed, or by their capacity to procure additional resources in a timely and cost-efficient manner. In many cases, if the customer (service requester) has not allowed for ample lead time, then the request likely is not fulfilled by the Cloud provider, or is not fulfilled in a timely manner.

SUMMARY OF THE INVENTION

This invention provides a system or method to provide dynamically packaged Cloud services to customers via a Cloud services registry. The Cloud services registry would be dynamic by polling different Cloud service providers and Cloud service databases to ensure that the Cloud services registry is up to date with the latest available Cloud services. The Cloud services registry would be available for queries from Cloud customers and abstract multiple Cloud service providers. By abstracting the Cloud services, the dynamic Cloud services registry would create a modular package of different services from different Cloud service providers based on the query and requested priority for services. The dynamic Cloud registry would be constantly updated based on the level of services that the provider has available. The dynamic registry would determine what service best matches the requirements from a Cloud service request (CSR) and return a personalized set of matching services back.

A first aspect of the present invention provides a method for optimizing Cloud service delivery within a Cloud computing environment, comprising: receiving a request for Cloud services from a Cloud customer in the Cloud computing environment; building a Cloud service package to fulfill the request based on a Cloud services registry and a set of requirements set forth by the Cloud customer; and making the Cloud service package available to the Cloud customer.

A second aspect of the present invention provides a system for optimizing Cloud service delivery within a Cloud computing environment, comprising: a memory medium comprising instructions; a bus coupled to the memory medium; and a processor coupled to the bus that when executing the instructions causes the system to: receive a request for Cloud services from a Cloud customer in the Cloud computing environment; build a Cloud service package to fulfill the request based on a Cloud services registry and a set of requirements set forth by the Cloud customer; and make the Cloud service package available to the Cloud customer.

A third aspect of the present invention provides a computer readable medium containing a program product for optimizing Cloud service delivery within a Cloud computing environment, the computer readable medium comprising program code for causing a computer system to: receive a request for Cloud services from a Cloud customer in the Cloud computing environment; build a Cloud service package to fulfill the request based on a Cloud services registry and a set of requirements set forth by the Cloud customer; and make the Cloud service package available to the Cloud customer.

A fourth aspect of the present invention provides a method for deploying a system for optimizing Cloud service delivery within a Cloud computing environment, comprising: providing a computer infrastructure being operable to: receive a request for Cloud services from a Cloud customer in the Cloud computing environment; build a Cloud service package to fulfill the request based on a Cloud services registry and a set of requirements set forth by the Cloud customer; and make the Cloud service package available to the Cloud customer.

BRIEF DESCRIPTION OF THE DRAWINGS

These and other features of this invention will be more readily understood from the following detailed description of the various aspects of the invention taken in conjunction with the accompanying drawings in which:

FIG. 6 shows a Cloud service request according to the present invention.

Figure 1:
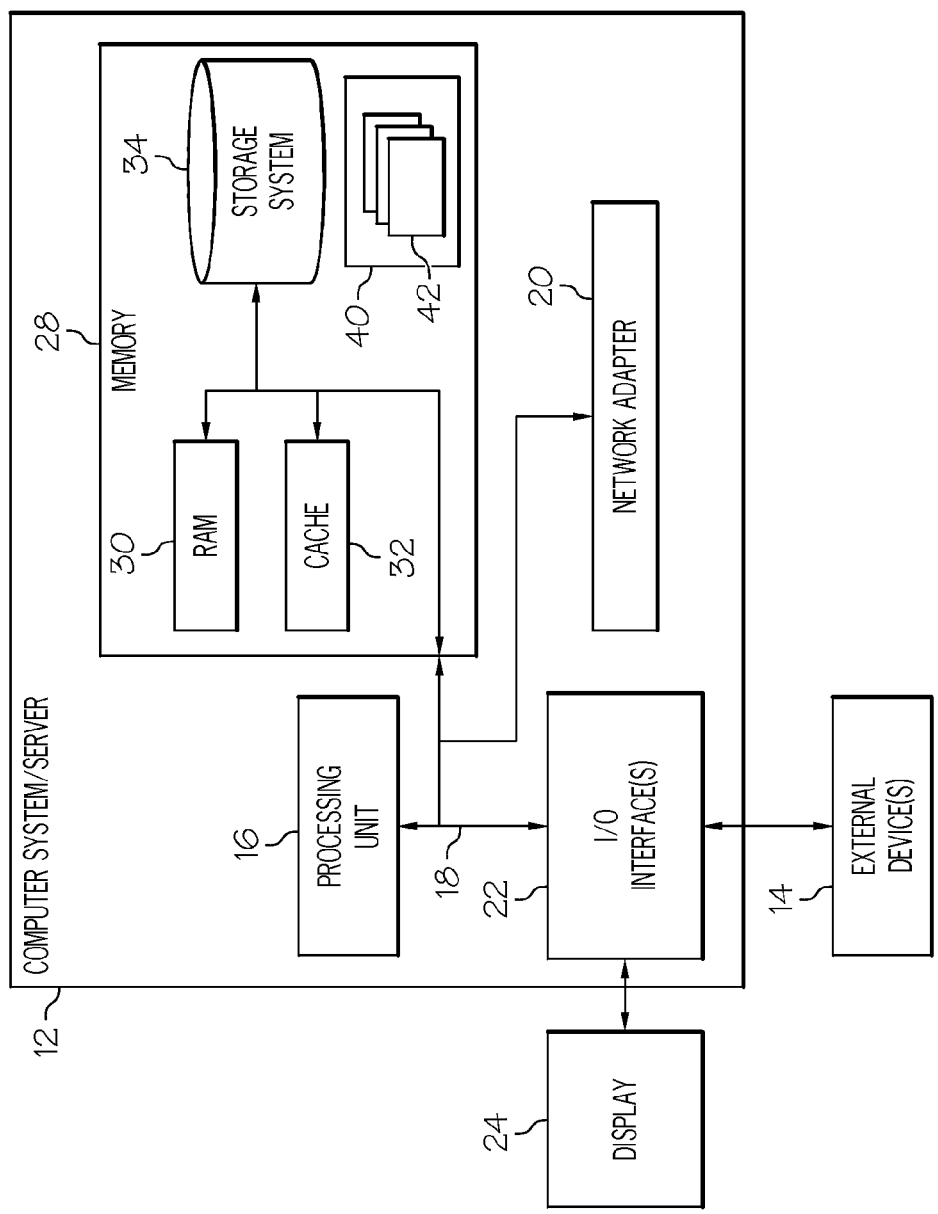
FIG. 1 shows a Cloud system node according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
  I. Cloud Computing Definitions
  II. Detailed Implementation of the Invention

I. Cloud Computing Definitions

The following definitions have been derived from the "Draft NIST Working Definition of Cloud Computing" by Peter Mell and Tim Grance, dated Oct. 7, 2009, which is cited on an IDS filed herewith, and a copy of which is attached thereto.

Cloud computing is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is comprised of at least five characteristics, at least three service models, and at least four deployment models.

Characteristics are as follows:

On-demand self-service: A consumer can unilaterally provision computing capabilities, such as server time and network storage, as needed automatically without requiring human interaction with each service's provider.

Broad network access: Capabilities are available over a network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Cloud Software as a Service (SaaS): The capability provided to the consumer is to use the provider's applications running on a Cloud infrastructure. The applications are accessible from various client devices through a thin client interface such as a web browser (e.g., web-based email). The consumer does not manage or control the underlying Cloud infrastructure including network, servers, operating systems, storage, or even individual application capabilities, with the possible exception of limited user-specific application configuration settings.

Cloud Platform as a Service (PaaS): The capability provided to the consumer is to deploy onto the Cloud infrastructure consumer-created or acquired applications created using programming languages and tools supported by the provider. The consumer does not manage or control the underlying Cloud infrastructure including networks, servers, operating systems, or storage, but has control over the deployed applications and possibly application hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying Cloud infrastructure, but has control over operating systems, storage, deployed applications, and possibly limited control of select networking components (e.g., host firewalls).

Deployment Models are as follows:

Private cloud: The Cloud infrastructure is operated solely for an organization. It may be managed by the organization or a third party and may exist on-premises or off-premises.

Community cloud: The Cloud infrastructure is shared by several organizations and supports a specific community that has shared concerns (e.g., mission, security requirements, policy, and compliance considerations). It may be managed by the organizations or a third party and may exist on-premises or off-premises.

Public cloud: The Cloud infrastructure is made available to the general public or a large industry group and is owned by an organization selling Cloud services.

Hybrid cloud: The Cloud infrastructure is a composition of two or more clouds (private, community, or public) that remain unique entities, but are bound together by standardized or proprietary technology that enables data and application portability (e.g., Cloud bursting for load-balancing between clouds).

A Cloud computing environment is service oriented with a focus on statelessness, low coupling, modularity, and semantic interoperability.

II. Implementation of the Invention

As indicated above, this invention provides a system or method to provide dynamically packaged Cloud services to customers via a Cloud services registry. The Cloud services registry would be dynamic by polling different Cloud service providers and Cloud service databases to ensure that the Cloud services registry is up to date with the latest available Cloud services. The Cloud services registry would be available for queries from Cloud customers and abstract multiple Cloud service providers. By abstracting the Cloud services, the dynamic Cloud services registry would create a modular package of different services from different Cloud service providers based on the query and requested priority for services. The dynamic Cloud registry would be constantly updated based on the level of services that the provider has available. The dynamic registry would determine what service best matches the requirements from a Cloud service request (CSR) and return a personalized set of marching services back. A weighting system based on the needs of the customer would determine what priorities are needed for each customer.

In response to the request, the dynamic Cloud service registry would build a composite Cloud service package based on the different categories of available Cloud services that meet the requirements stated in the request from the Cloud customer. For example, if a Cloud customer requested a desktop publishing service that including requirements for photographic editing, graphic filters, color printing, and PDF creation, the dynamic Cloud registry may build a packaged Cloud service that included Cloud services from Adobe® for photographic editing and PDF creation, FedEx®/Kinkos® for color printing services, and graphic filters from Pantone® Color.

One component of this invention is that the dynamic Cloud registry would act as a hub and update its available services in real-time and create a custom Cloud service based on the modular needs of the Cloud customer. The needs of the client are filled based on their specific application requirements. This invention reduces the complexity of Cloud customers finding Cloud services and may improve the selection of Cloud services through the dynamic registry.

Referring now to FIG. 1, a schematic of an exemplary Cloud computing node is shown. Cloud computing node 10 is only one example of a suitable Cloud computing node and is not intended to suggest any limitation as to the scope of use or functionality of the invention described herein. Regardless, Cloud computing node 10 is capable of being implemented and/or performing any of the functions set forth in section I above.

In Cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed Cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on, that perform particular tasks or implement particular abstract data types. The exemplary computer system/server 12 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 12 in Cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, and removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

Program/utility 40 having a set (at least one) of program modules 42 may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
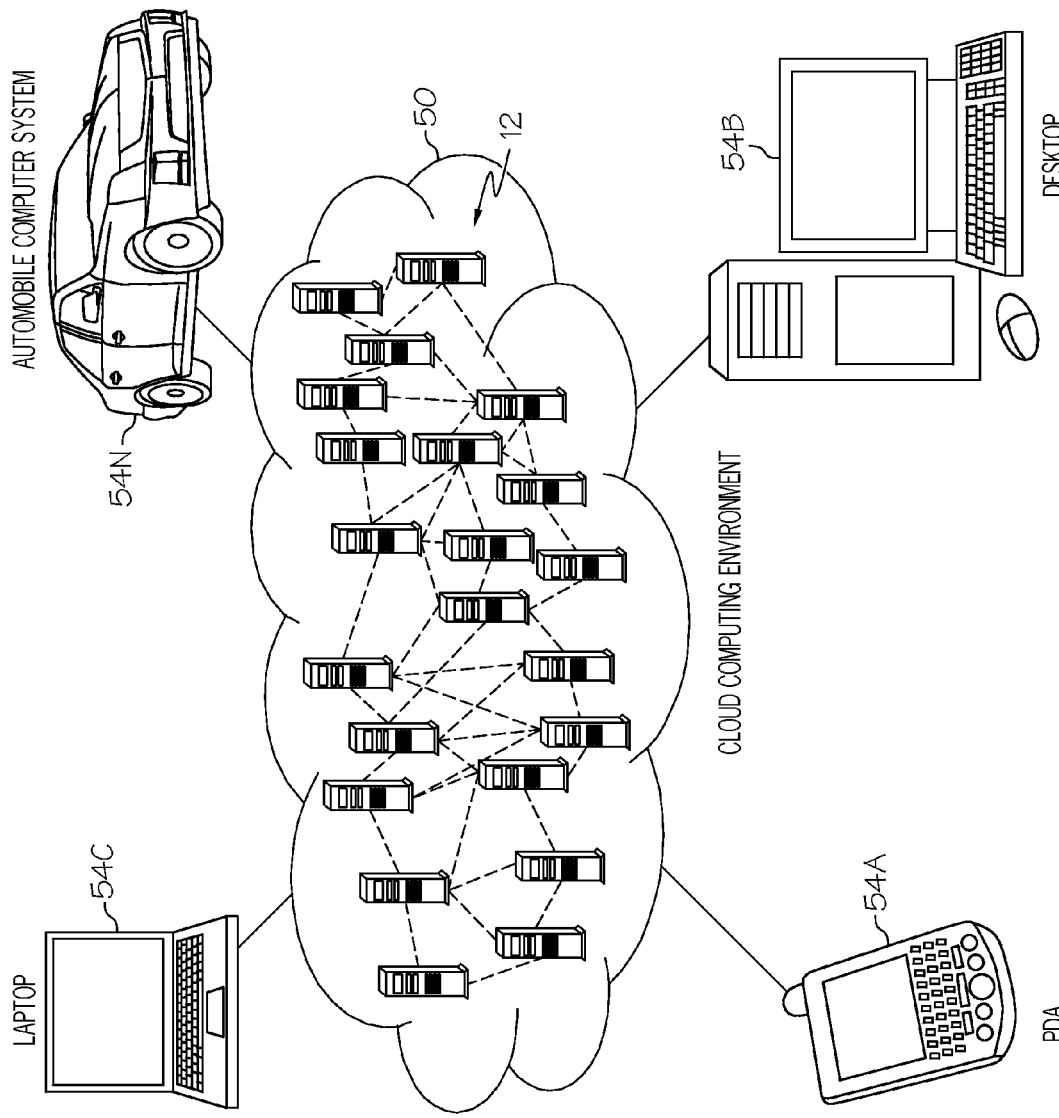
FIG. 2 shows a Cloud computing environment according to the present invention.

Referring now to FIG. 2, illustrative Cloud computing environment 50 is depicted. As shown, Cloud computing environment 50 comprises one or more Cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms and/or software to be offered as services (as described above in Section I) from Cloud computing environment 50, so as to not require each client to separately maintain such resources. It is understood that the types of computing devices 54A-N shown in FIG. 2 are intended to be illustrative only and that Cloud computing environment 50 can communicate with any type of computerized device over any type of network and/or network/addressable connection (e.g., using a web browser).

Figure 3:
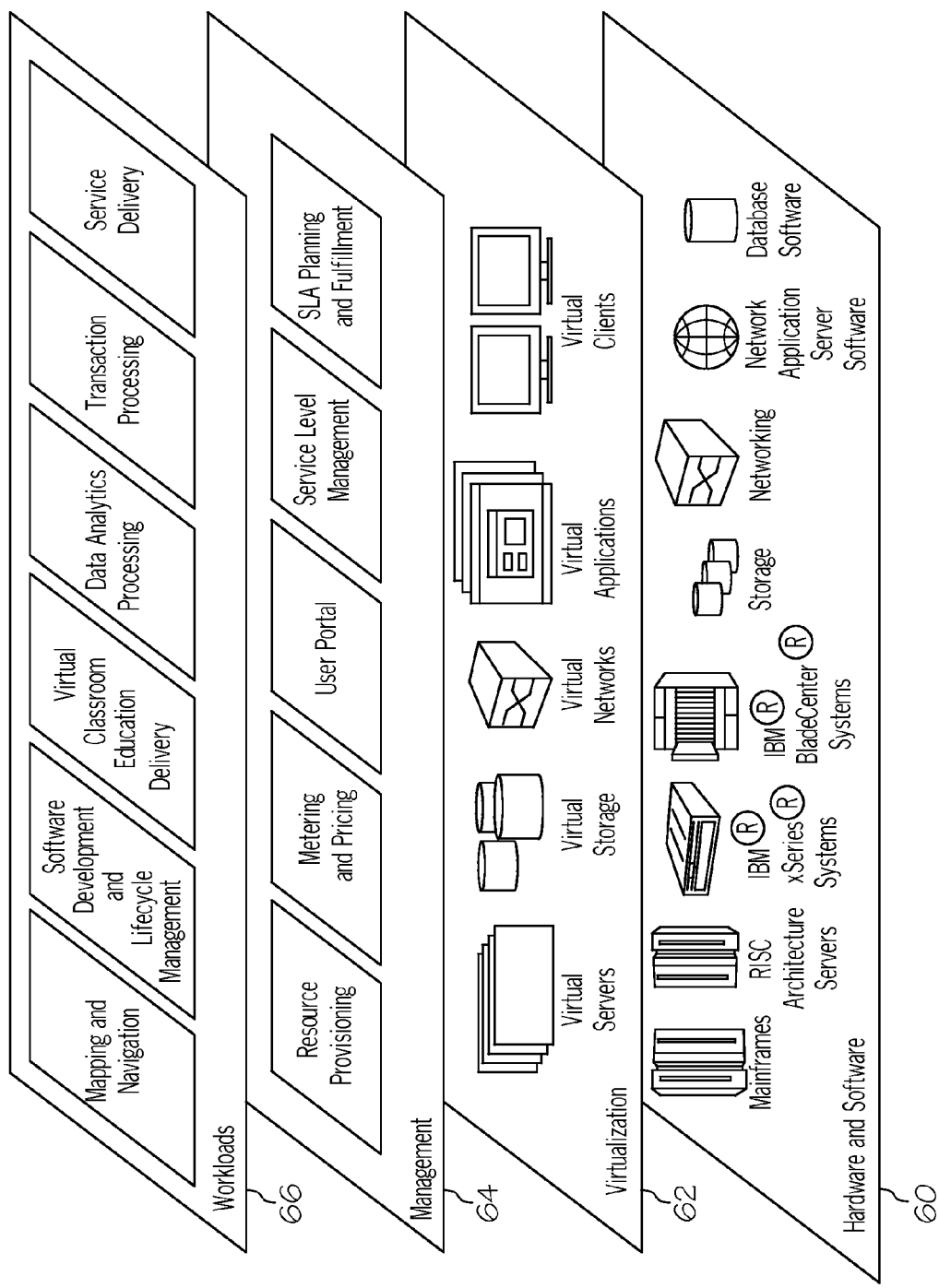
FIG. 3 shows Cloud abstraction model layers according to the present invention.

Referring now to FIG. 3, a set of functional abstraction layers provided by Cloud computing environment 50 (FIG. 2) is shown. It should be understood in advance that the components, layers, and functions shown in FIG. 3 are intended to be illustrative only, and the invention is not limited thereto. As depicted, the following layers and corresponding functions are provided:

Hardware and software layer 60 includes hardware and software components. Examples of hardware components include mainframes. In one example, IBM® zSeries® systems, and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software, and database software. In one example, IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual applications; and virtual clients.

Management layer 64 provides the exemplary functions described below. Resource provisioning provides dynamic procurement of computing resources and other resources that are utilized to perform tasks within the Cloud computing environment. Metering and pricing provide cost tracking as resources are utilized within the Cloud computing environment, and billing or invoicing for consumption of these resources. In one example, these resources may comprise application software licenses. Security provides identity verification for users and tasks, as well as protection for data and other resources. User portal provides access to the Cloud computing environment for both users and system administrators. Service level management provides Cloud computing resource allocation and management such that required service levels are met. Service Level Agreement (SLA) planning and fulfillment provides pre-arrangement for, and procurement of, Cloud computing resources for which a future requirement is anticipated in accordance with an SLA.

Workloads layer 66 provides functionality for which the Cloud computing environment is utilized. Examples of workloads and functions which may be provided from this layer include: mapping and navigation; software development and lifecycle management; virtual classroom education delivery; data analytics processing; transaction processing; and service delivery. As mentioned above, all of the foregoing examples described with respect to FIG. 3 are illustrative only, and the invention is not limited to these examples.

Figure 4:
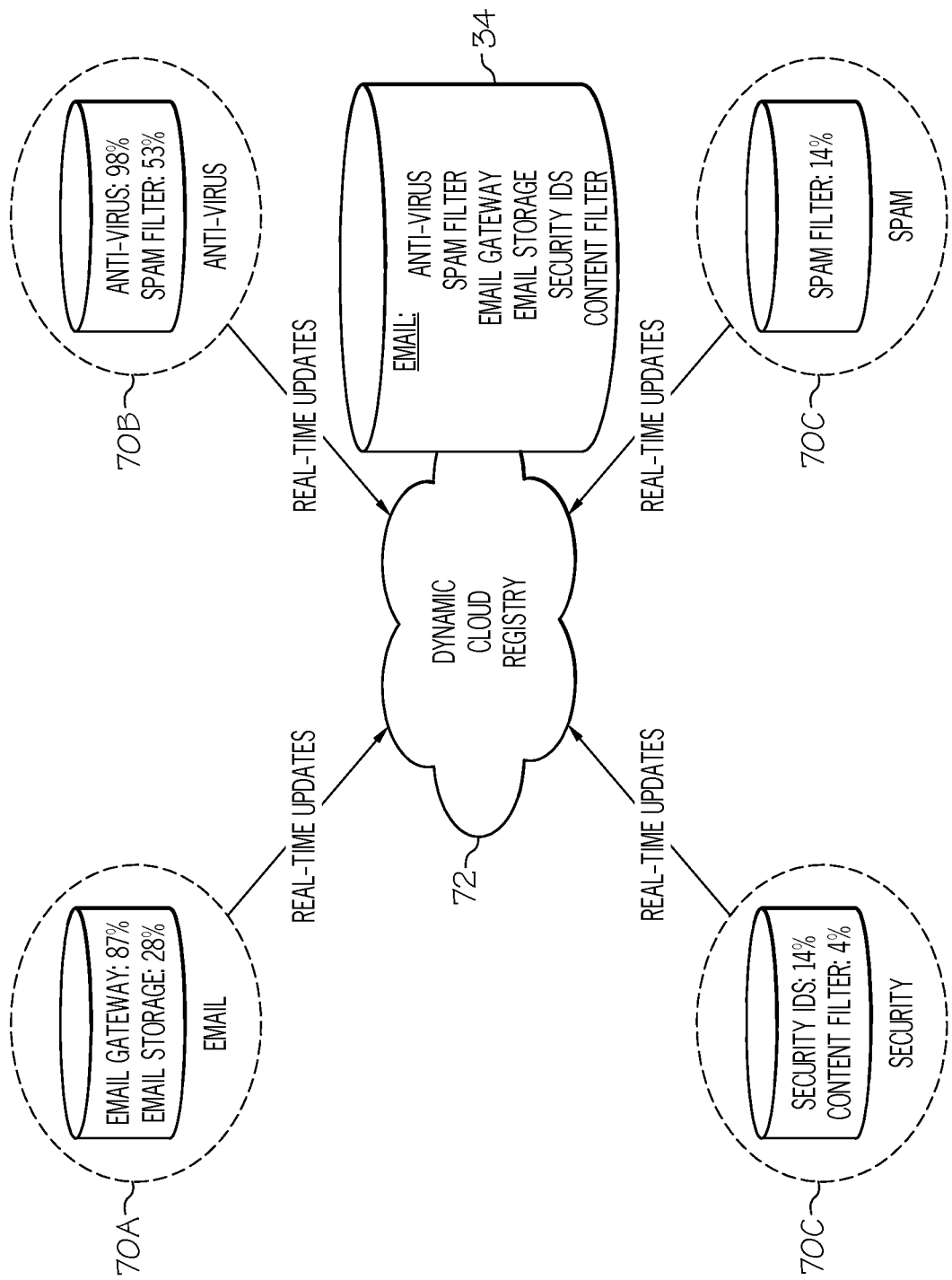
FIG. 4 shows an illustrative central Cloud service registry according to the present invention.

As indicated above, the method of this invention would allow for a platform for Cloud providers to publish their Cloud services customers via a Cloud services registry database. A more detailed example of this is shown in FIG. 4. As depicted, a Cloud services registry 72 (which can be implemented as a storage system 34) would pull from different Cloud application repositories and update the registry 72 with the most recent data that is provided by the Cloud service providers 70A-D. As specifically depicted, real-time updates regarding the available services and their corresponding capabilities can be received from providers 70A-D and be used to build a custom Cloud service for (in this example) email.

In this example of a customer looking for email services, the customer will have at least three options. Their first option is to procure the email services through the traditional infrastructure and application route by creating and procuring the necessary hardware, software, and services (internal or external). The second option is to look for the email services via a private or public cloud. This option is limited due to the client requiring to sign up with a dedicated provider with a one-to-one relationship. The introduction of the Cloud services registry 72 introduces a third option. The use of Cloud computing to build a dynamic and modular service based on the specific needs for the customer. This highlights the need for a dynamic registry of available Cloud services that different Cloud application service providers are aligned to. The Cloud application service provider would populate the dynamic Cloud registry and allow the dynamic registry to pull from updates from the Cloud application service providers to maintain the most up-to-date information on the services.

Based on the available Cloud services, the Cloud customer would create a generic Cloud Service Request (CSR) to the dynamic Cloud service registry. The Cloud service registry would take the request, filter the requirements and priorities of the request and, by abstracting the Cloud service providers from the customer, build a modular and specific Cloud service quote back to the customer based on their needs. The Cloud service registry would be able to pick from the different Cloud application service providers based on the detailed requirements specified in the request.

Figure 5:
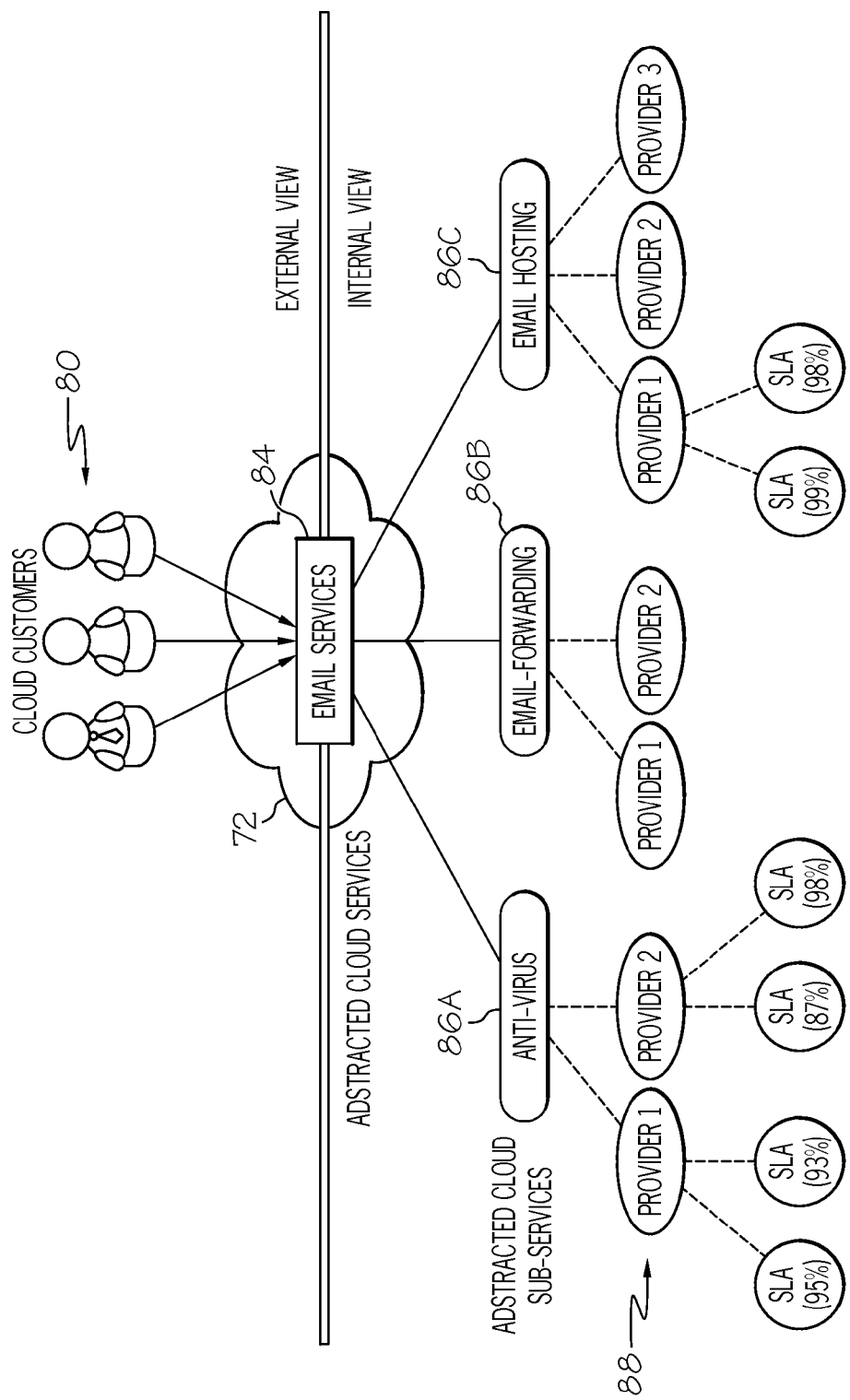
FIG. 5 shows an illustrative example according to the present invention.

These concepts are further shown in FIG. 5. As depicted, Cloud customers 80 are attempting to obtain an email service 84, which is a bundle of individual or abstracted Cloud (sub)-services 86A-C obtained via a set (one or more) of Cloud providers 88. To reach this point, Cloud registry 72 may build a customer Cloud package/bundle 84 from Provider-1 for Anti-Virus, Provider-2 for Email Forwarding and use Provider-3 for Email Hosting based on the requirements, pricing level, and availability of the Cloud services. The next request that is made to Cloud registry 72 may be different based on the dynamic and changing needs of Cloud customer(s) 80 and the changing availability of the Cloud services that Cloud providers 88 have available.

The dynamic Cloud registry 72 may create a competitive marketplace for Cloud application service providers. The marketplace may better connect Cloud customers with Cloud service providers. This would solve the business problem of customers that need applications that are available on a Cloud infrastructure. Without a means of locating Cloud services that meet the Cloud customer requirements that may include, but are not limited to, performance, availability, scalability, or security, Cloud customers may not find a technical solution to their business problem.

Moreover, the dynamic nature of the Cloud registry (similar to a real-time quoting system) may allow customers to choose a custom bundled set of modular applications that are specific to the business based on their requirements for technical functionality and price. Since the Cloud services would be abstracted from the customer, the Cloud registry would tailor the Cloud service request based on the priority of the Cloud customer. The Cloud customer receives a custom quote for cloud-based applications. The Cloud service providers gain a functional marketplace based on their available capacity and Cloud services.

To reach this point, each Cloud customer 80 would submit a request 90 (e.g., an XML) to the Cloud service provider that is outlined in FIG. 6. This would outline the different requirements that each Cloud service provider would be matched against. Based on the price per seat requirements, SLA needs, and security mechanism, the dynamic registry would return a customized quote for each individual Cloud client. Since each Cloud client would have their own specific needs and requirements, as well as the dynamic nature of the Cloud resources that the Cloud registry is collecting, the individual needs of each Cloud client and service provider will be customized.

The request 90 of FIG. 6 shows a basic configuration showing a Cloud customer requiring access to three advertised for Anti-Virus, Email Forwarding and Email Hosting. Due to the abstraction of Cloud services, Cloud service 1 and Cloud service 2 provide all services, while Provider-3 is added for Email Hosting. The concepts described above determine which provider should be 'matched up' to the advertised services such that the customer gets service. This is based on the weighted average that the Cloud client uses when it fills out its requirements. The request and/or profile of the customer above dictates that Anti-Virus is 50% of the requirement while Web-based email may be only 5%. This system will best determine what back-end Cloud provider will be identified as the best option for Cloud services.

EXAMPLE

Customer Profile

A customer profile must exist for each customer that requires the use of Cloud services. Such profiles can be stored in a central profile registry/database (not shown) and should include (but is not limited to):
 Customer name
 Customer ID
 Location
 Current network bandwidth available
 Current amount of processing power available
 Subscribed services list complete with preferred Cloud providers
  Primary Cloud provider
  Secondary Cloud provider

Cloud Service Provider Profile

A Cloud Service Provider must exist for each customer that requires the use of Cloud services. Such profiles can be stored in a central profile registry/database (not shown) and should include (but is not limited to):
 Cloud Provider name
 Cloud Provider unique ID
 Public/Private
 Security Authentication (Y/N)
 :Authentication (x.509 keys, username/password, etc)
 :Data Security (1=Critical, 2=High, 3=Medium, 4=Low)
 :Encryption Options (3DES, AES 256-bit keys, etc)
 Location(s):
 Current Network Bandwidth Available
 Current Amount of Processing Power Available
 Subscribed Services List Complete with Preferred Cloud Providers
  SLA Criteria
  :Performance
  :Availability
  :Average Transaction Time
  Contract or Service Agreement The customer profile determines the current state of the customer—based on location information (for example, using GPS) the current statistics and details surrounding the availability of the customer location must be kept up to date. An example may be "customer is currently in x location, with y bandwidth available, connected to z Wi-Fi network". Included in the profile must be a list of Cloud services that the customer is interested in. This list may be determined when the customer registered with their primary Cloud provider. At the minimum, it may contain information such as "I am interested in electronic mail services."

The Cloud Service Provider profile lists the Cloud service provider and available service that is provided. This available Cloud service may be based on the Cloud service taxonomy that is used to abstract the different Cloud service providers. The Cloud customers may search for difference Cloud services based on the Cloud naming taxonomy. The Cloud service providers are abstracted from the customers to allow for an open market place and for the results of the search criteria to be returned to the customers without any direct reference. For example, when a Cloud customer searches the Cloud service registry for the following criteria: 95% SLA, centralized service, x.509 authentication. This dynamic profile information is stored in two locations—with the customer locally (so that information contained in the profile may be sent with a services request) AND on a central profile registry—the details of which are described below:

Central Profile Registry

The central profile registry is a system that may be similar to an LDAP or UDDI directory. A customer may continually upload current profile information in a push fashion or the registry may schedule a time to "pull" information from the customer. This registry may be highly available and accessible to both customers and Cloud providers via a multiple array of networks and locations. Although not described in this disclosure, the registry may be a replication of multiple registries associated with different network segments to ensure that it is available as much as possible regardless of whether it is centralized or decentralized. Multiple registries may be synchronized in batch or real time.

The Following are Example Steps for this Embodiment:

(1) A Cloud service taxonomy is created to list the available Cloud services. Each part of the Cloud service taxonomy may include different parameters or characteristics such as (but not limited to) service level agreement, service level targets, vendor(s), standards, etc.

(2) The Cloud service taxonomy is then transposed into a Cloud service registry. This registry may resemble a hierarchical database structure. This structure will abstract the different services from the possible Cloud service providers. Since the Cloud customers may search on the Cloud service characteristics (based on their business need) and services, the abstraction is used to hide the different Cloud providers. This may help ensure that the query results meet the needs of the customer, not the needs of the Cloud service provider.

(3) The Cloud registry should be open, standards-based, and use XML to be compatible with most registries.

(4) The Cloud service providers may access the Cloud registry and input their Cloud service provider information that lists the Cloud Service provider profile that is described above. These may include, and are not limited to, the search criteria for the profile.

(5) The Cloud registry would connect to the different Cloud application service providers and pull in the latest updates on available services, pricing, SLA information, and application functionality.

(6) The Cloud registry would update the database of available services that are available.

(7) In the event of that a Cloud customer requires access to a new business service that is available via Cloud computing, a Cloud customer may search the Cloud registry for the availability of this service. The Cloud customer may use a thin (web browser) or thick (local application) client to create a request/query that is directed at the Cloud service registry. The request may be transposed into XML and then routed to the registry.

(8) The request includes the name of the Cloud service, sub-service, and any SLA requirements.

Figure 7:
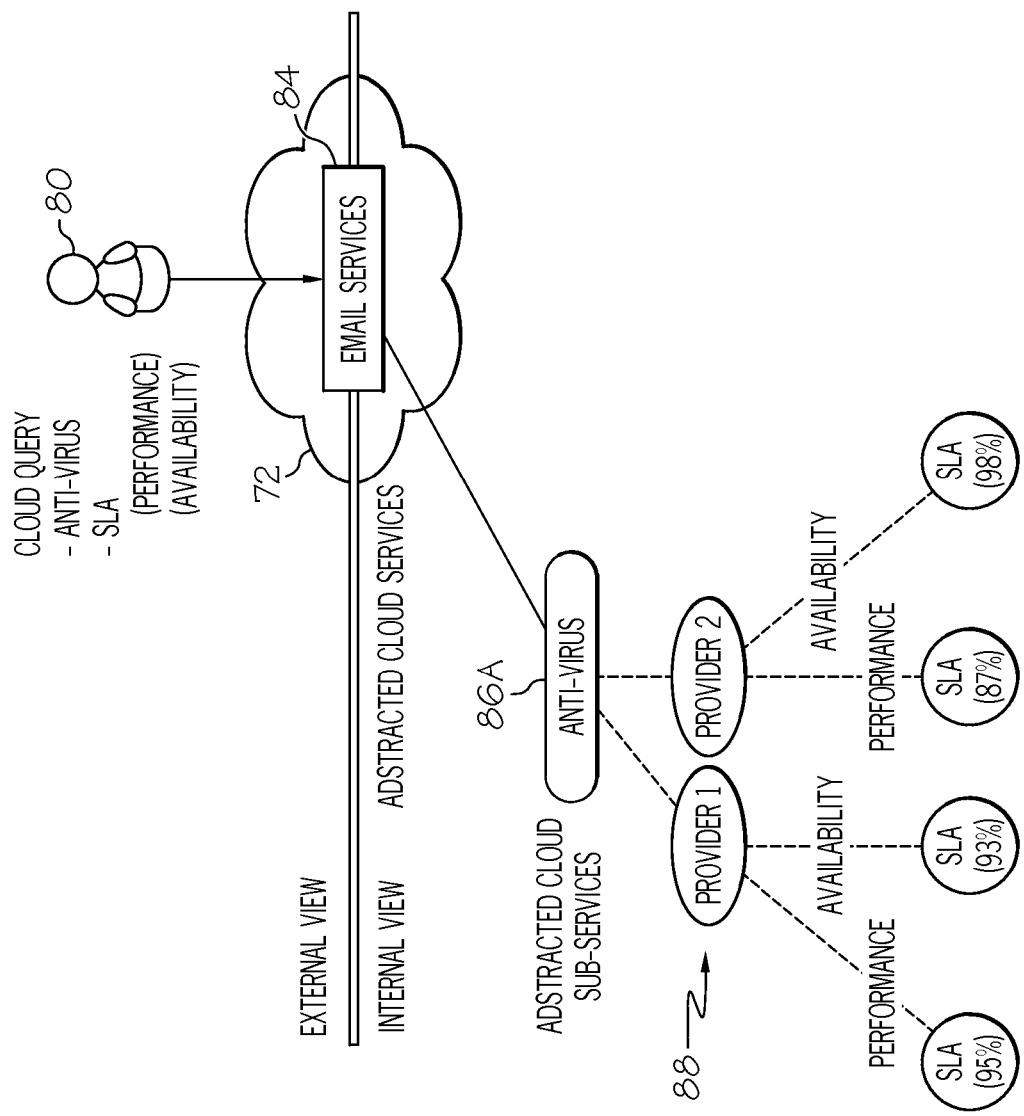
FIG. 7 shows an illustrative process flow diagram according to the present invention.

An example of the process is outlined below and in FIG. 7:
A. Request (for email services) 84 is sent to the Cloud service registry 72.
B. The Cloud service registry 72 routes the request 84 to the Anti-Virus sub-service.
C. The Cloud service registry 72 looks at the two available providers 88 to determine if the request meets the customer 80's requirements.
D. Provider-1 meets both SLA requirements for Performance and Availability
E. The Cloud service registry 72 returns the information to the database and may also include a caching feature to improve the speed of the Cloud service registry 72 service.

F. The information is then routed to the Cloud customer 80 with the contact information of the Cloud provider to begin the business transaction.

Figure 8:
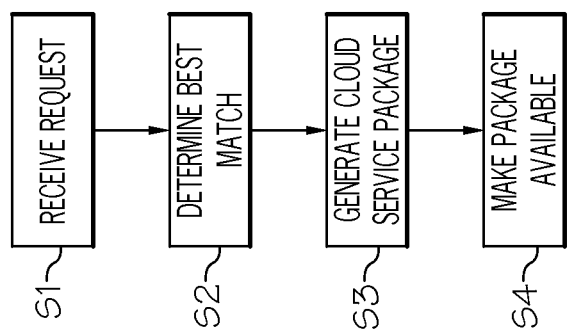
FIG. 8 depicts a method flow diagram according to the present invention.

Referring now to FIG. 8, a method flow diagram according to the present invention is shown. As depicted, in step S1, a request is received from a Cloud customer in the Cloud computing environment. In step S2, a best match is determined between a set of available Cloud services and the set of requirements. In step S3, a Cloud service package to fulfill the request is built. In step S4, the Cloud service package is made available to the Cloud customer.

While shown and described herein as a Cloud service delivery optimization solution, it is understood that the invention further provides various alternative embodiments. For example, in one embodiment, the invention provides a computer-readable/useable medium that includes computer program code to enable a computer infrastructure to provide Cloud service delivery optimization functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method that performs the process of the invention on a subscription, advertising, and/or fee basis. That is, a service provider, such as a Solution Integrator, could offer to provide Cloud service delivery optimization. In this case, the service provider can create, maintain, support, etc., a computer infrastructure, such as computer system 12 (FIG. 1) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing Cloud service delivery optimization functionality. In this case, a computer infrastructure, such as computer system 12 (FIG. 1), can be provided, and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

We claim:

1. A method for optimizing Cloud service delivery within a Cloud computing environment, comprising:
    receiving a request for Cloud services from a Cloud customer in the Cloud computing environment, the request comprising a set of Cloud service requirements and relative priorities corresponding to each of the set of Cloud service requirements, wherein the request is a search request;
    determining a best match between a set of available Cloud services and the set of requirements;
    building a Cloud service package to fulfill the request, the Cloud service package comprising at least one Cloud service available from at least one Cloud provider and being a modular package of custom selected configurable hardware resources and custom selected configurable software computing resources having a plurality of different services automatically selected based on the set of Cloud service requirements, and the relative priorities among each of the set of requirements from a dynamically updated Cloud services registry containing a plurality of different services from a plurality of different Cloud service providers;
    providing, based on the determined best match, a result of the search request to the Cloud customer, abstracting the at least one Cloud service provider from the customer based on a Cloud naming taxonomy; and
    making the Cloud service package available to the Cloud customer.

2. The method of claim 1, the Cloud services registry comprising a plurality of services provided by a plurality of Cloud providers and a capability of each of the plurality of Cloud providers in providing the plurality of Cloud services.

3. The method of claim 2, the Cloud services registry being based on a provider profile associated with each of the plurality of Cloud providers.

4. The method of claim 1, the set of requirements being set forth in the request.

5. The method of claim 1, the set of requirements being set forth in a customer profile associated with the Cloud customer.

6. A system for optimizing Cloud service delivery within a Cloud computing environment, comprising:
a memory medium comprising instructions;
a bus coupled to the memory medium; and
a processor coupled to the bus that when executing the instructions causes the system to:
receive a request for Cloud services from a Cloud customer in the Cloud computing environment, the request comprising a set of Cloud service requirements and relative priorities corresponding to each of the set of Cloud service requirements, wherein the request is a search request;
determine a best match between a set of available Cloud services and the set of requirements;
build a Cloud service package to fulfill the request, the Cloud service package comprising at least one Cloud service available from at least one Cloud provider and being a modular package of custom selected configurable hardware resources and custom selected configurable software computing resources having a plurality of different services automatically selected based on a set of Cloud service requirements and relative priorities corresponding to each of the set of Cloud service requirements from a dynamically updated Cloud services registry containing a plurality of different services from a plurality of different Cloud service providers;
provide, based on the determined best match, a result of the search request to the Cloud customer, abstracting the at least one Cloud service provider from the customer based on a Cloud naming taxonomy; and
make the Cloud service package available to the Cloud customer.

7. The system of claim 6, the Cloud services registry comprising a plurality of services provided by a plurality of Cloud providers, and a capability of each of the plurality of Cloud providers in providing the plurality of Cloud services.

8. The system of claim 7, the Cloud services registry being based on a provider profile associated with each of the plurality of Cloud providers.

9. The system of claim 6, the set of requirements being set forth in the request.

10. The system of claim 6, the set of requirements being set forth in a customer profile associated with the Cloud customer.

11. A non-transitory computer readable storage medium containing a program product for optimizing Cloud service delivery within a Cloud computing environment, the non-transitory computer readable storage medium comprising program code for causing a computer system to:
receive a search request for Cloud services from a Cloud customer in the Cloud computing environment, the search request comprising a set of Cloud service requirements and relative priorities corresponding to each of the set of Cloud service requirements, wherein the request is a search request;
determine a best match between a set of available Cloud services and the set of requirements;
build a Cloud service package to fulfill the request, the Cloud service package comprising at least one Cloud service available from at least one Cloud provider and being a modular package of custom selected configurable hardware resources and custom selected configurable software computing resources having a plurality of different services automatically selected based on the set of Cloud service requirements, and the relative priorities among each of the set of requirements from a dynamically updated Cloud services registry containing a plurality of different services from a plurality of different Cloud service providers;
provide, based on the determined best match, a result of the search request to the Cloud customer, abstracting the at least one Cloud service provider from the customer based on a Cloud naming taxonomy; and
make the Cloud service package available to the Cloud customer.

12. The non-transitory computer readable storage medium containing the program product of claim 11, the Cloud services registry comprising a plurality of services provided by a plurality of Cloud providers, and a capability of each of the plurality of Cloud providers in providing the plurality of Cloud services.

13. The non-transitory computer readable storage medium containing the program product of claim 12, the Cloud services registry being based on a provider profile associated with each of the plurality of Cloud providers.

14. The non-transitory computer readable storage medium containing the program product of claim 11, the set of requirements being set forth in the request.

15. The non-transitory computer readable storage medium containing the program product of claim 11, the set of requirements being set forth in a customer profile associated with the Cloud customer.

16. A method for deploying a system for optimizing Cloud service delivery within a Cloud computing environment, comprising:
providing a computer infrastructure being operable to:
receive a search request for Cloud services from a Cloud customer in the Cloud computing environment, the search request comprising a set of Cloud service requirements and relative priorities corresponding to each of the set of Cloud service requirements, wherein the request is a search request;
determine a best match between a set of available Cloud services and the set of requirements;
build a Cloud service package to fulfill the request, the Cloud service package comprising at least one Cloud service available from at least one Cloud provider and being a modular package of custom selected configurable hardware resources and custom selected configurable software computing resources having a plurality of different services automatically selected based on the set of Cloud service requirements, and the relative priorities among each of the set of requirements from a dynamically updated Cloud services registry containing a plurality of different services from a plurality of different Cloud service providers;
provide, based on the determined best match, a result of the search request to the Cloud customer, abstracting the at least one Cloud service provider from the customer based on a Cloud naming taxonomy; and
make the Cloud service package available to the Cloud customer.

* * * * *